May 12, 1942.   H. A. ELLEFSON   2,282,567
WINDROWER
Filed July 19, 1940
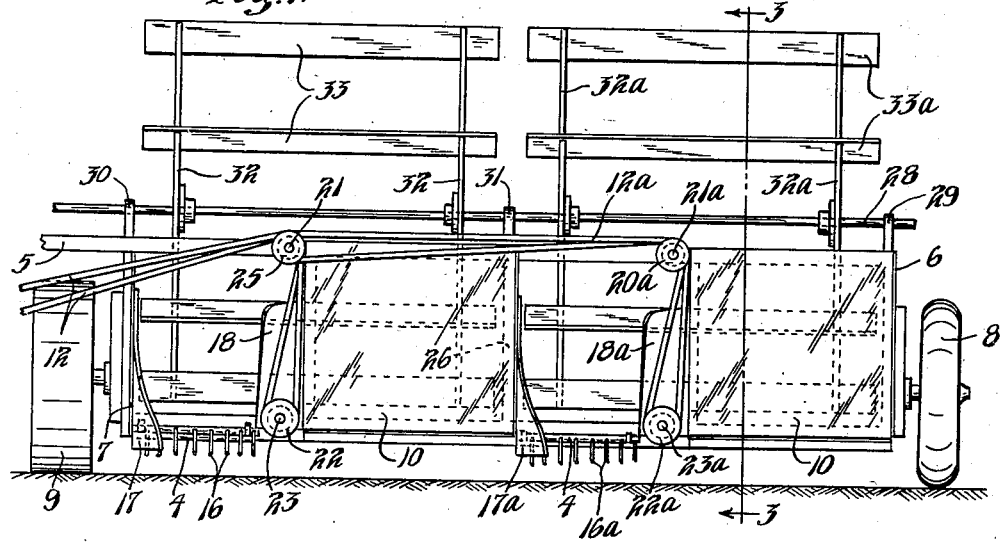
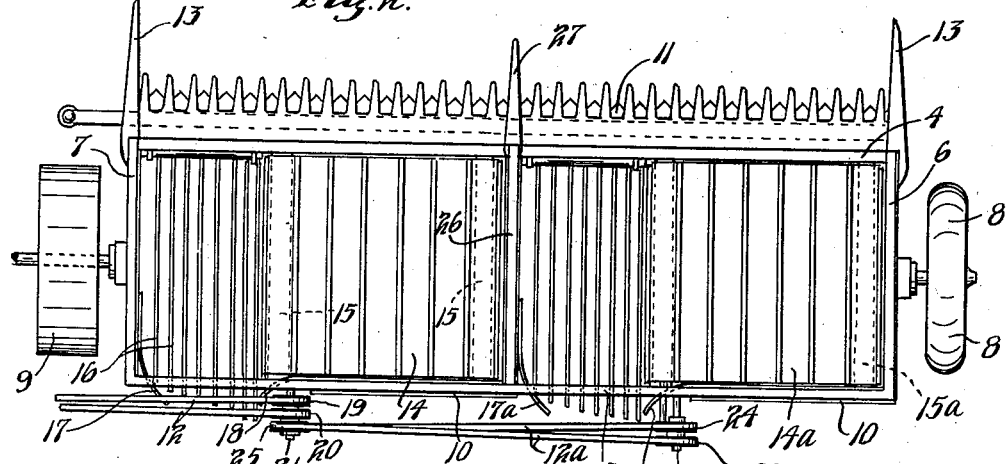
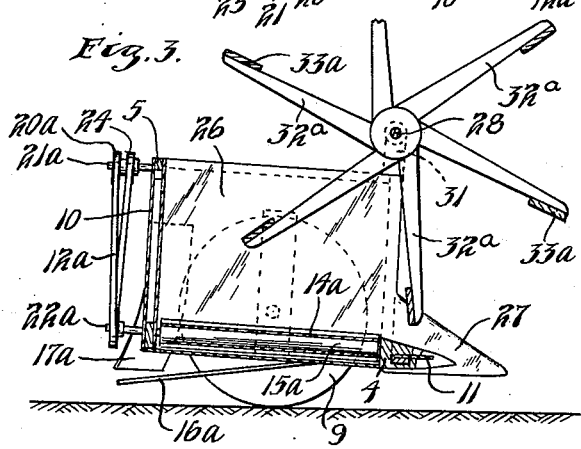
INVENTOR.
HENRY A. ELLEFSON.
BY HIS ATTORNEYS.
Williamson & Williamson Patented May 12, 1942

2,282,567

UNITED STATES PATENT OFFICE 2,282,567

WINDROWER

Henry A. Ellefson, Jackson, Minn.

Application July 19, 1940, Serial No. 346,377

5 Claims. (Cl. 56—192)

This invention relates to windrowers and more particular to that type whereby a swath is cut and placed in a windrow.

When harvesting grain and similar crops it is frequently desirable to cut the crop and form it in windrows so that it will dry out and produce better conditions for threshing than it is usually possible to obtain when the crop is cut and immediately threshed by a combine. When windrows are formed it is highly desirable that a minimum of travel over the stubble take place because when the stubble is mashed down by multiplicity of wheel tracks it will not properly support the windrow out of contact with the ground and air cannot get to that part of the windrow on the underside.

Windrowers of different lengths have been manufactured and it has been possible to cut a relatively wide swath and lay it in the windrow so that the crop is cut fairly quickly and a relatively small number of wheel tracks are formed in the stubble. However, the size of the windrow is definitely limited by the capacity of the combine which later picks up the windrow and harvests the grain. For best threshing conditions the windrow cannot be too large or much of the grain will pass through the threshing apparatus without being properly acted upon.

It is, therefore, a general object of my invention to provide means for cutting a relatively wide swath and to split the swath into two or more windrows of an advantageous size for proper threshing with a combine while at the same time mashing down a minimum of stubble so that the windrows will be properly supported by the stubble.

Another object of the invention is to provide a multiple windrower in combination with a single swath cutter wherein a standard cutter bar can be used and wherein the swath is split to deliver equal portions thereof to the individual windrow formers.

A further object of the invention is to provide parallel conveyor and windrow former units wherein the driving of the additional conveyor or conveyors is simple and economically arranged.

Still another object of the invention is to provide reel mechanism which is adapted for use with a multiple windrow former assembly.

These and other objects and advantages of the invention will more fully appear from the following description made in connection with the accompanying drawing, wherein, like reference characters refer to the same parts throughout the views, and, in which:

Fig. 1 is a rear elevation of a windrower formed in accordance with my invention;

Fig. 2 is a plan view thereof with the reel structure removed; and

Fig. 3 is a section taken approximately on the line 3—3 of Fig. 1.

The windrower frame is generally conventional. It includes a lower longitudinal front frame member 4, an upper longitudinal rear frame member 5 and end frame members 6 and 7. The outer end of the frame is suitably supported by a wheel 8 on a stub axle, such as is well known in the art, and the inner or left-hand end of the frame is supported by a ground engaging power wheel 9. It is, of course, contemplated that the desired power can be derived from the power take off of a tractor if desired. A pair of vertically positioned double walled back members 10 are supported by the upper longitudinal rear frame member 5 and suitably connected to the remainder of the frame. The details of this structure are not brought out for the reason that they are features conventional in the art.

A cutter assembly generally indicated at 11 extends across the longitudinal forward portion of the frame and is supported by the lower forward frame member 4. This cutter assembly is also conventional and it is unnecessary to go into any detailed description thereof. At the ends of the cutter are crop guides 13, such as are usually found on apparatus of this type.

Behind portions of the cutter mechanism 11 I provide a pair of substantially horizontal canvas and slat conveyors 14 and 14a which run on spaced rollers 15 and 15a an assembly which is indicated in the sectional view in Fig. 3. It will be seen that the conveyors 14 and 14a are spaced from each other longitudinally of the frame and that the combined lengths of two conveyors are less than the overall length of the frame. At the left-hand end of the frame, which in this case is the inner end, I provide a metal tine windrow former 16 which in combination with the deflector plates 17 and 18 permits the grain which is received on the tines from the cutter and that which is conveyed from cutter portions from the conveyor 14 into windrows to be deposited on the ground from the lower rear ends of the tines. The conveyor 14 is conveniently driven by means of an endless belt 12 which leads from a suitable power driven pulley, not shown, over an idler pulley 19 and a pulley 20 which is secured to the upper shaft 21, the idler pulley being rotated with respect to said shaft. The belt 12 thence leads downwardly to a pulley 22 which is secured upon a lower shaft 23 to rotate the same. Shaft 23 carries the lefthand conveyor roller 15.

The right-hand conveyor 14a is mounted between a pair of conveyor rollers 15a and the lefthand roller 15a of the pair just mentioned is mounted on a shaft 23a which has secured thereto a pulley 22a. An upper shaft 21a is supported by suitable journals on the rear frame member 5, and this shaft carries a pair of idler pulleys 22a and 24. A belt 12a is run between a pulley 25 mounted for rotation with the shaft 21 and the lower right-hand pulley 22a, said belt passing over the upper right-hand idler pulleys 20a and 24.

At the left-hand end of conveyor 14a is a windrower device 16a made up of downwardly and rearwardly slanting tines suitably secured to the forward longitudinal member 4 as in the case of the windrower 16 and said windrower units 16a include a pair of deflector plates 17a and 18a.

Positioned between the left-hand side of the windrower unit 16a and the right-hand end of the conveyor 14 is a transverse vertical partition 26 which separates the two pairs of conveyors and windrow tine units. This partition terminates approximately at the rear edge of the cutter mechanism 11 but there is a forward extension in the form of a divider 27 which is adapted to split the crop just as it reaches the cutter so that one-half of it will be confined to the inner half of the cutter and the other half will be cut off by the outer or right-hand half of the cutter.

Mounted between the upper edges of the frame ends 6 and 7 adjacent their forward portions is a reel shaft 28 supported by suitable journals 29 and 30. The left-hand end of the shaft is extended and is adapted to be suitably connected for rotation to some power source such as a connection with a ground wheel 9 or a power take off to a tractor as desired. The central portion of the shaft 28 may be supported by a journal 31 mounted on the upper forward corner of the central transverse partition 26. The left-hand portion of the shaft 28 carries a pair of conventional spiders 32 which carry the usual reel slats 33, and the right-hand portion of the shaft 28 carries a pair of spiders 32a which rotatably support reel slats 33a. It will be seen that the adjacent ends of the slats on the two reel units are spaced so that as the entire reel assembly rotates these spaced slats will pass on either side of the central transverse partition 26.

From the structure described it will be seen that I have provided a windrower structure wherein it is possible to cut a swath of a predetermined length and to split the swath after cutting into two windrows in order that relatively wide swaths can be cut and at the same time the size of the windrows can be reduced to at least half the size of a windrow wherein there is a single conveyor and windrow former. This apparatus will make no more wheel tracks than a single windrow former whereas the use of a smaller single windrower will greatly multiply the number of wheel tracks and amount of stubble mashed to the ground. The cutter bar unit is conventional but I have provided means for splitting the swath in the form of the divider 27 and I control the movement of the crop on the individual units by means of a partition dividing the units into independent operating sections. The reel structure is different to some extent but to produce my reel unit it is necessary only to mount a double axially spaced reel assembly on the usual continuous reel supporting shaft. The additional windrower units are conveniently coupled with the innermost units to provide a simple drive mechanism for the additional conveyor canvas and the construction of the apparatus in accordance with my invention is only slightly more expensive than a conventional single windrower. It is possible to lay windrows from relatively wide swath cuts which can be easily picked up and threshed with combines of limited capacity, whereas satisfactory threshing of larger windrows with the smaller combines is not possible from a practical standpoint.

It will, of course, be understood that various changes may be made in the form, details, arrangement and proportions of the various parts without departing from the scope of my invention.

What is claimed is:

1. A windrower comprising, an ambulant supporting frame having first and second sides, cutter mechanism extending along the forward edge of said frame, a first crop conveyor extending from the first side of said frame toward the second side thereof and having a discharge end terminating a substantial distance from said second side, a second crop conveyor having one end thereof spaced from the discharge end of said first crop conveyor and extending toward said second side, said second conveyor having its discharge end located adjacent said second side of said frame, and means for driving both of said crop conveyors in the same direction to cause that portion of a cut swath received by said first conveyor to be discharged between said first and second conveyors, and to cause that portion of the cut swath received by said second conveyor to be discharged by said second conveyor adjacent said second side of said frame.

2. The structure in claim 1 and a partition on said frame positioned transversely of the direction of movement of said conveyor, said partition being spaced from the discharge end of said first conveyor and located adjacent the receiving end of said second conveyor.

3. The structure in claim 1 and a first windrow former supported by said frame between said first and second conveyors, and a second windrow former at the discharge end of said second conveyor adjacent said second side of said frame.

4. A windrower comprising, an ambulant supporting frame, having first and second sides, cutter mechanism extending along the forward edge of said frame, a first crop conveyor extending from the first side of said frame toward the second side thereof and having a discharge end terminating a substantial distance from said second side, a second crop conveyor having one end thereof spaced from the discharge end of said first crop conveyor and extending toward the second side of said frame, said second crop conveyor having its discharge end located adjacent said second side of said frame, means for driving both of said crop conveyors in the same direction to cause that portion of a cut swath received by said first conveyor to be discharged between said first and second conveyors, and to cause that portion of the cut swath received by said second conveyor to be discharged by said second conveyor adjacent said second side of said frame, and a swath divider extending across said frame from front to rear adjacent the crop receiving end of said second conveyor.

5. The structure in claim 4 and said divider having at least a portion thereof extending forwardly of said cutter mechanism.

HENRY A. ELLEFSON.